United States Patent [19]

Hanna et al.

[11] Patent Number: 5,406,410
[45] Date of Patent: Apr. 11, 1995

[54] OPTICAL FIBRE AMPLIFIER AND LASER

[75] Inventors: David C. Hanna, Southampton; Jeremy N. Carter, Kent; Anne C. Tropper; Richard G. Smart, both of Hants, all of England

[73] Assignee: British Telecommunications plc, London, England

[21] Appl. No.: 54,969

[22] Filed: May 3, 1993

[30] Foreign Application Priority Data

Sep. 3, 1990 [GB] United Kingdom ............... 9019186

[51] Int. Cl.⁶ .......................... H01S 3/06; H01S 3/094
[52] U.S. Cl. ........................................ 359/341; 372/6; 372/40; 372/70; 359/109
[58] Field of Search ............... 359/341, 109; 372/6, 372/40, 41, 71, 75, 70

[56] References Cited

U.S. PATENT DOCUMENTS

| | | | |
|---|---|---|---|
| 4,965,803 | 10/1990 | Esterowitz et al. | 372/5 |
| 4,967,416 | 10/1990 | Esterowitz et al. | 372/41 |
| 4,969,150 | 11/1990 | Esterowitz et al. | 372/105 |
| 4,969,154 | 11/1990 | Esterowitz et al. | 372/41 |

OTHER PUBLICATIONS

France et al, "Progress in Fluoride Fibres for Optical Communications", BT Telecom Technol J., vol. 5, No. 2, Apr. 1987.
Allain et al, Electron. Lett., vol. 25, #24, pp. 1660–1662, Nov. 23, 1989.
Allen et al, Appl. Phys. Lett., vol. 55, #8, pp. 721–722, Aug. 21, 1989.
Esterowitz et al, Electron. Lett., vol. 24, #17, p. 1104, Aug. 18, 1988; abst. only provided herewith.
Hanna et al, Electron. Lett., vol. 24, #19, pp. 1222–1223, Sep. 15, 1988; Abst. only provided herewith.
"Continuous–Wave Oscillation of a Monomode Thulium–Doped Fibre Laser", Electronics Letters, 15th Sep. 1988, vol. 24, No. 19, pp. 1222–1223.
"Tunable CW Lasing Around 0.82, 1.48, 1.88 and 2.35 μm In Thulium–Doped Fluorozirconate Fibre", Electronics Letters, 25 (Nov. 23, 1989) vol. 25, No. 24, pp. 1660–1662.
"CW Diode–Pumped Operation of 1.97μm Thulium–Doped Flurozirconate Fibre Laser", Electronics Letters, 26th Apr. 1990, vol. 26, No. 9, pp. 599–601.
Allen et al, "CW Diode Pumped 2.3μm Fiber Laser", Applied Physics Letters, 55 (1989) Aug. 21, No. 8, New York, U.S., pp. 721–722.
Guery et al, "Optical Properties of $TM^{3+}$ Ions in Indium–Based Fluoride Glasses", Journal of Luminescence, 42(1988) pp. 181–188.
Millar et al., "Efficient Up–Conversion Pumping At 800nm of an Erbium–Doped Fluoride Fibre Laser Operating at 850nm", Electronics Letters, Oct. 25, 1990, vol. 26, No. 22, pp. 1871–1873.
Davey et al, SPIE 1581, Fiber Loses Lovaces and Amplifiers III, 1991.
Davey et al, Br. Telecom. J., (UK), vol. 7, #1, pp. 58–68; Jan. 1989.

Primary Examiner—Nelson Moskowitz
Attorney, Agent, or Firm—Nixon & Vanderhye

[57] ABSTRACT

An optical fibre amplifier comprises a thulium-doped optical fibre pumped at 790 nm by a semi-conductor diode laser coupled to the fibre via optical fibre coupler. The amplifier is optically coupled in series to a pair of systems fibres to provide amplification to optical signals.

15 Claims, 3 Drawing Sheets

PARTIAL ENERGY LEVEL DIAGRAM FOR $Tm^{3+}$ – DOPED ZBLANP GLASS

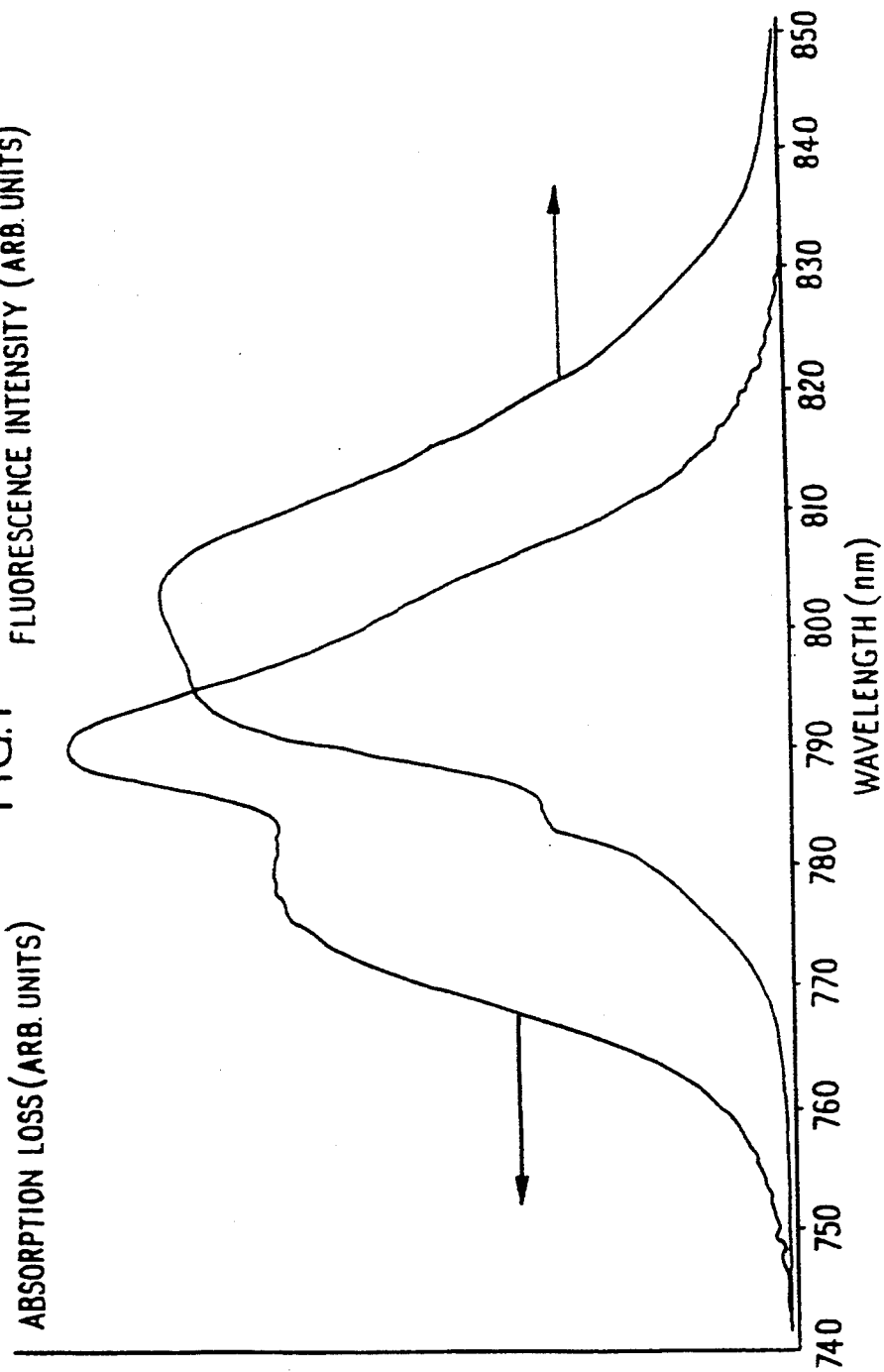
FIG.1 ABSORPTION AND FLUORESCENCE SPECTRA FOR $^3F_4-^3H_6$ TRANSITIONS IN $Tm^{3+}$ DOPED ZBLANP SCATTERED PUMP LIGHT AT 784 nm CAN BE SEEN IN THE FLUORESCENCE SPECTRUM

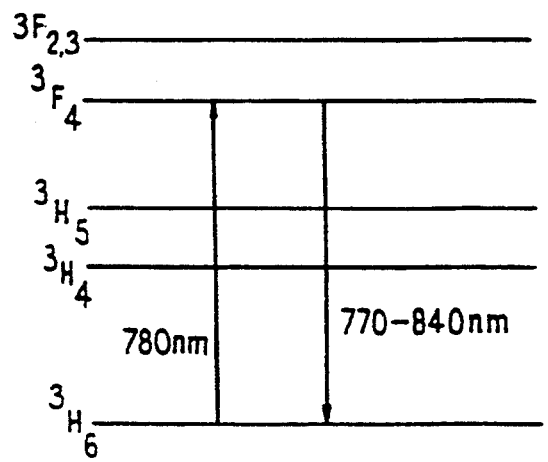
PARTIAL ENERGY LEVEL DIAGRAM FOR $Tm^{3+}$ - DOPED ZBLANP GLASS
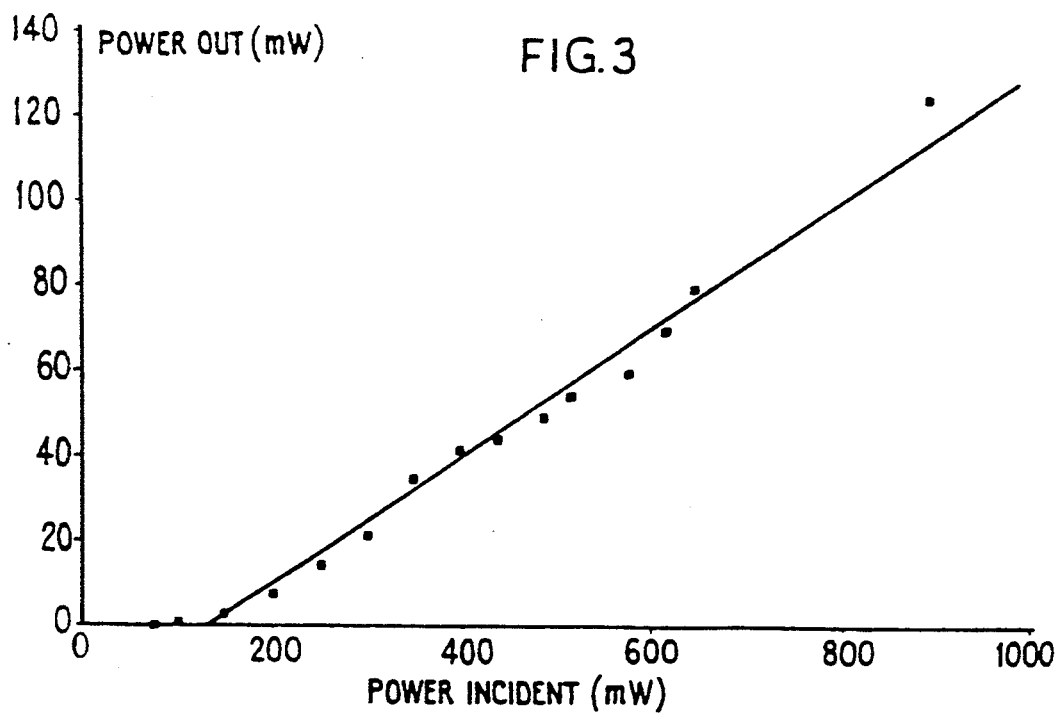
OUTPUT POWER VERSUS INCIDENT PUMP POWER AT 777 nm FOR 70% OUTPUT COUPLING AT 803 nm

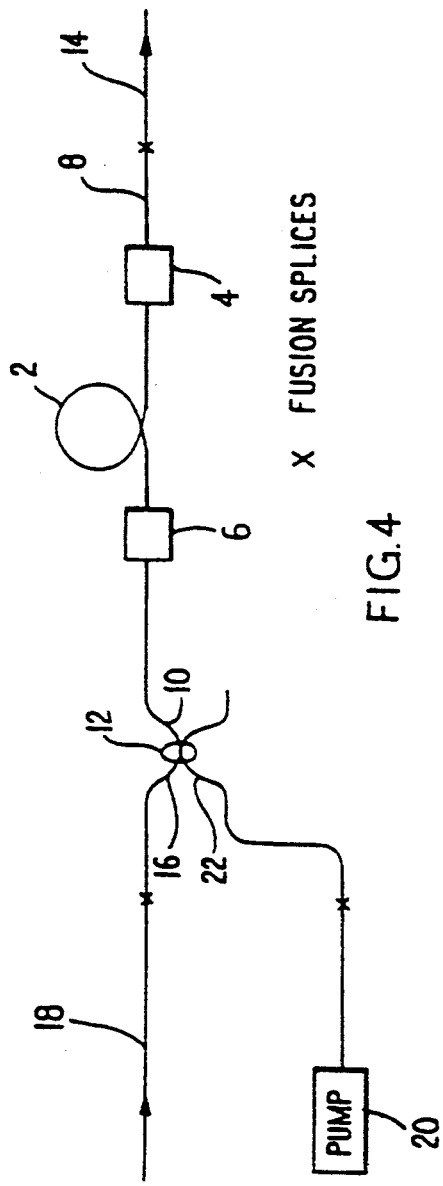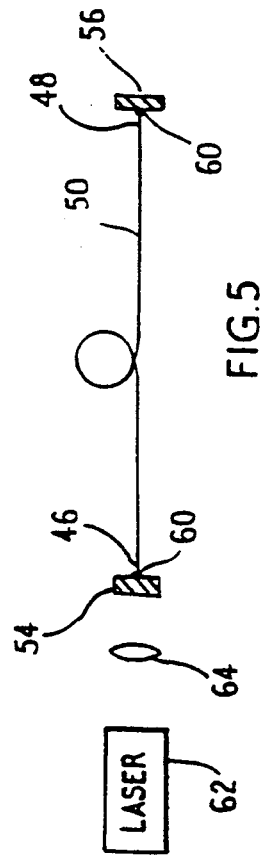

OPTICAL FIBRE AMPLIFIER AND LASER

This is a continuation of our earlier-filed copending PCT application, PCT/GB 91/1487, filed 3 Sep. 1991 designating the United States and claiming priority from UK application 9019186.7 filed Sep. 3, 1990. Priority rights pursuant to 35 U.S.C. §§ 119, 120, 363 and 365 are hereby claimed.

FIELD OF THE INVENTION

This invention relates to optical fibre amplifiers, lasers and optical communications systems incorporating them. It relates particularly to those based on transitions associated with the $Tm^{3+}$ ion in a fluorozirconate optical fibre host.

RELATED ART

A consequence of the reduced phonon energies in fluorozirconate glass hosts, when compared with silica based glasses, is that the lifetimes of many of the energy levels of rare earth ions doped into the matrix are significantly increased. This results in a greater number of metastable levels capable of providing an upper population reservoir for laser emission. Coupled with the confinement over a long length and good spatial overlap of the pump and signal modes in a waveguide geometry, this can lead to the realisation of many new laser sources in fibre form.

Thulium is a particularly attractive dopant ion for use in a fibre laser since it has a strong absorption band centred at 790 nm, a wavelength which is readily available from AlGaAs laser diodes. Diode pumped $Tm^{3+}$-doped fluorozirconate fibre lasers have already been reported at 1.9 $\mu$m (Carter J. N., Smart R. G., Hanna D. C. and Tropper A. C.: "CW diode pumped operation of a 1.97 $\mu$m thulium-doped fluorozirconate fibre laser", Electronics Letters, 1990, 26, pp 599–601 and Allen R. and Esterowitz L.: "CW diode pumped 2.3$\mu$m fiber laser", Appl. Lett., 1989, 55, pp 721–722, respectively) and laser emission has also been reported at 820 nm (Allain J. Y., Monerie M. and Poignant H.: Tunable cw lasing around 0.82, 1.48, 1.88 and 2.35 $\mu$m in a thulium-doped fluorozirconate fibre", Electronics Letters, 1989, 25, pp 1660–1662 on the $^3F_4$–$^3H_6$ transition when pumped with a krypton ion laser at 676.4 nm.

SUMMARY OF THE INVENTION

The present invention provides an optical amplifier comprising a fluorozirconate optical fibre having its core doped with Tm and pump means for providing optical pump power to raise the $Tm^{3+}$ ions directly to the upper Stark levels of the $^3F_4$ level.

The transition exploited by the pumping scheme of the present invention is the $^3F_4$–$^3H_6$ transition which is of particular value as not only can it be pumped by diode lasers, but the gain also falls within the wavelength region of AlGaAs diode lasers. The prospect of high gain amplification and energy storage (hence Q-switching capability) available at AlGaAs diode laser wavelengths suggest that this transition may offer a means for greatly increasing the versatility of diode laser sources. The $^3F_4$–$^3H_6$ transition is a particularly favourable transition in ZBLANP glass, as the non-radiative, multiphonon decay rate out of the $^3F_4$ level is negligible compared to the radiative rate, and furthermore the branching ratio of this transition dominates the other radiative rates at 2.3 $\mu$m, and 1.47 $\mu$m. By contrast, in fused silica non-radiative decay from the $^3F_4$ level is rapid (typically giving a lifetime of less than 20 $\mu$s, whereas we have measured the lifetime in fluorozirconate to be 1.1 ms.

Preferably, the pump means is a diode laser, in particular an AlGaAs laser.

The invention also provides a laser comprising a resonant cavity configured to resonate at the wavelength of the $^3F_4$–$^3H_6$ transition and an optical amplifier within the resonant cavity, the optical amplifier being as defined above. The resonant cavity may be defined by butting the ends of the fibre amplifier against dielectric mirrors, for example.

The invention further provides an optical communication system comprising an optical fibre communications network optically coupled into either an optical amplifier as defined above or a laser as defined above.

BRIEF DESCRIPTION OF THE DRAWINGS

Embodiments of the present invention will now be described and their principle of operation explained with reference to the accompanying drawing of which FIG. 1 is a graph of the absorption loss and fluorescence intensity of a $Tm^{3+}$ doped ZBLANP optical fibre;

FIG. 2 is a partial energy level diagram for $Tm^{3+}$ doped ZBLANP glass;

FIG. 3 is a graph of the output power versus incident pump power at 777 nm for 70% output coupling at 803 nm;

FIG. 4 is a schematic diagram of an optical communications system of the present invention incorporating an optical amplifier according to the present invention; and FIG. 5 is a schematic diagram of a laser according to the present invention.

DETAILED DESCRIPTION OF PREFERRED EMBODIMENTS

FIG. 1 shows both the absorption loss and fluorescence spectra over the range 740–850 nm corresponding to transitions between the $^3F_4$ and $^3H_6$ levels where the absorption measurements were taken in a bulk $Tm^{3+}$-doped ZBLANP glass sample. The fibre 50 (see FIG. 5) used in these experiments was of the standard ZBLANP composition, fabricated by a known casting technique details of which are not included here. Reference can be made, however, to the articles titled by P. W. France, S. F. Carter, M. W. Moore and C. R. Day, BT Telecom Technology Journal, Vol. 5, No. 2, April 1987, pp 28–44 and "Continuous-Wave Oscillation of A Monomode Thulium-Doped Fibre Laser " by Hanna et al, Electronics Letters, 1988, 24, pp 1222–1223. The fibre was doped with 1000 ppm by weight of thulium ($Tm^{3+}$) ions and had a core diameter of 6 $\mu$m with a cut-off wavelength of 1.6 $\mu$m pumped at 780 nm by a Ti: sapphire laser 62.

The absorption loss at the 790 nm peak is calculated to be 24 dB/m for the concentration in the fibre. The fluorescence spectrum was obtained by pumping the fibre with light at 784 nm (into the upper Stark levels of $^3F_4$) from a Ti: sapphire laser, and observing it in side light so as to avoid distortion by re-absorption. Ions in the $^3F_4$ level relax almost totally radiatively with calculated branching to the $^3H_5$, $^3H_4$ and $^3H_6$ levels of 3%, 9% and 89% respectively, The calculation is similar to that in Guery C., Adam J. L. and Lucas J: "Optical properties of $Tm^{3+}$ ions in indium-based fluoride glasses", J Luminescence, 1988, 42 pp 181–188, but carried out here with parameters appropriate to ZBLANP glass. Decay giving rise to photons at around 800 nm is therefore the preferred route and the one exploited in this scheme.

For laser operation a standard Fabry-Perot cavity was formed by butting the cleaved ends 46, 48 (see FIG. 5) of a 0.7 m long fibre 50 up to two dielectric mirrors 54, 56 and flooding the contacts with index matching fluid 60. Pump light from a tunable Ti: sapphire laser 62 was coupled into the fibre using a ×10 microscope objective lens 64. The input mirror 54 was highly reflecting (>99%) at wavelengths greater than 805 nm, had a maximum transmission of 90% at 777 nm, and a steep transmission edge between 790 nm and 800 nm (where transmission was 80% and 5% respectively). These figures are quoted here for transmission in air, and may be significantly degraded when the mirror/fibre butt is in index matching fluid. Continuous laser emission was observed at 806 nm corresponding to the $^3F_4$–$^3H_6$ transition. Lowest threshold operation of 20 mW of pump power incident on the launch optics (and therefore an estimated 6 mW launched into 20 the single mode fibre) was achieved with a similar highly-reflecting mirror 56, on the output and with the pump laser 62 tuned to 777 nm and Eke peak transmission of the input mirror 54. Excitation was, therefore, into the high energy side of the $^3F_4$, level, and emission from this level to the ground $^3H_6$ level as shown in FIG. 2

With this configuration of two highly-reflecting mirrors 54, 56 at the signal wavelength, for an incident pump power of 650 mW, the maximum output power at 806 nm was 5 mW. However, when the output mirror 56 was changed for a mirror with a shifted, but similarly sharp, transmission edge (so that the cavity now had feedback in air of 90%, 30% and 95% at the pump wavelength, 805 nm and 820 nm respectively) laser emission was observed continuous-wave at 803 nm and also pulsed (self terminating) at 823 nm, with threshold pump powers of 80 mW and 95 mW respectively. The self-terminating nature of the 823 nm laser emission under these particular conditions was unexpected since this is a three-level transition. It may be due to a number of processes, in particular the excited state absorption of pump/signal photons on the $^3H_5$–$^1G_4$ transition. The variation of output power at 803 nm with pump power is shown in FIG. 3. The slope efficiency is 15% with respect to incident pump power (45% with respect to launched power) and for a maximum power of 900 mW incident on the launch optics 125 mW of power at 803 nm was obtained.

The scattering loss in the fibre was measured at 1 μm and around 1.5 μm to be a few dB/m while the exact loss at the signal wavelength could not be easily determined owing to the absorption at around 800 nm. The high threshold may be an indication of a loss in the cavity arising from either the intrinsic scattering loss of the fibre or high butt losses at the fibre/mirror interfaces.

This laser scheme is of particular interest in that the excitation and output wavelengths are both within the AlGaAs laser diode range. Combined with the recently demonstrated lasing at 850 nm when pumped by excited state absorption of photons at 801 nm in $Er^{3+}$-doped ZBLANP fibres (Millar C. A., Brierley, M. C., Hunt M. H. and Carter S. F. "Efficient up-conversion pumping at 810 nm of an erbium-doped fluoride fibre laser operating at 850 nm", submitted to Electronics Letters.), amplification is now available over a wide range of AlGaAs diode laser wavelengths The $^3F_4$–$^3H_6$ transition in thulium can be expected to be highly efficient in a low loss fibre due to the small Stokes shift between pump and signal photons, the high pump quantum efficiency (since pumping is directly into the upper laser level) and the good spatial overlap between pump and signal modes. That, together with the expected high gain, suggest a number of applications providing a more versatile source at 800 nm than is currently available with diode lasers alone. Attractive schemes include exploiting the energy storage properties of the Fabry-Perot cavity to generate high power Q-switched pulses by the inclusion of an intracavity modulator, using an intracavity tuning element to provide wavelength selection over the range 800–825 nm; providing high gain amplification of a low powered pulsed diode source; or conversion of a low brightness, single transverse mode output. This last possibility could be realised either by using a double-clad fibre where pump light from the diode array is launched into the inner-cladding and is then coupled into the doped core (made to be single mode at the lasing wavelength) along the length of the fibre.

A thulium doped fluoride fibre pumped as described above can also form the basis of a fibre amplifier, an embodiment of which is shown in the schematic diagram FIG. 4.

In FIG. 4 a $Tm^{3+}$doped fluorozinconate fibre 2 is coupled by splices 4 and 6 to a silica based optical fibre 8 and to a port 10 of a silica-based optical fibre coupler 12, respectively. The fibre 8 is fusion spliced to a silica based optical communications systems fibre 14.

Port 16 of the coupler 12 is fusion spliced to a silica-based optical communication systems fibre 18. A route is thereby provided for an incoming signal which is to be amplified from the fibre 18, though the coupler 12 to the fibre amplifier 2 and to the systems fibre 14 for onward transmission of the amplified signal.

The fibre amplifier 2 is pumped by a semiconductor diode 20 coupled to port 22 of the coupler 12 operating in the region of 780 nm.

We claim:

1. An optical amplifier for amplifying input light signals, said amplifier comprising:
   a fluorozirconate optical fibre having its core doped with $Tm^{3+}$, and
   pump means for providing optical pump power to said fibre to raise $Tm^{3+}$ ions therein directly to the upper Stark levels of the $^3F_4$ level.

2. An optical amplifier as in claim 1, in which the pump means includes a diode laser.

3. An optical amplifier as in claim 2, in which the diode laser is an AlGaAs laser.

4. An optical amplifier as in claim 1 in which the material of the optical fibre produces a non-radiative, multiphonon decay rate out of the $^3F_4$ level that is negligible compared to the radiative rate.

5. An optical amplifier as in claim 4, in which the optical fibre material comprises a ZBLANP composition.

6. An optical amplifier as in claim 1 in which the optical fibre is doped with about 1000 ppm weight of $Tm^{3+}$.

7. A laser comprising:
   a resonant cavity defined by reflection means and configured to resonate at the wavelength of the $^3F_4$–$^3H_6$ transition, and an optical amplifier within the resonant cavity, the optical amplifier including a fluorozirconate optical fibre having its core doped with Tm$^{3+}$ and pump means for providing optical pump power to said fibre to raise Tm$^{3+}$ ions therein directly to the upper Stark levels of the $^3F_4$ level.

8. A laser as in claim 7, in which the reflection means comprise a pair of dielectric mirrors.

9. A laser as in claim 8, in which one of the mirrors has a reflectivity greater than 99% for wavelengths greater than 805 nm.

10. A laser as in claim 9, in which said one mirror has a steep transmission edge between 790 nm and 800 nm in air.

11. A laser as in claim 9, in which both mirrors have a reflectivity greater than 99% for wavelengths greater than 805 nm and a steep transmission edge between 790 nm and 800 nm in air.

12. A laser as in claim 11, in which the optical pump power is at 777 nm.

13. A laser as in claim 10, and in which the other mirror has a reflectivity in air of about 90%, 30% and 95% at 777 nm, 805 nm and 820 nm respectively.

14. An optical communication system comprising an optical fibre communications network having an optical signal transmission fibre optically coupled into an optical amplifier for amplifying optical signals from the transmission fibre, said optical amplifier including a fluorozirconate optical fibre having its core doped with Tm$^{3+}$ and pump means for providing optical pump power to said fibre to raise Tm$^{3+}$ ions therein directly to the upper Stark levels of the $^3F_4$ level.

15. An optical communication system comprising:

an optical fibre communications network having an optical signal transmission fibre optically coupled to receive optical signals emanating from a laser;

said laser including a fluorozirconate optical fibre having its core doped with Tm$^{3+}$ and pump means for providing optical pump power to said fibre to raise Tm$^{3+}$ ions therein directly to the upper Stark levels of the $^3F_4$ level, said doped fibre being disposed within a resonant cavity defined by reflection means and configured to resonate at the wavelength of the $^3F_4$–$^3H_6$ transition.

* * * * *